United States Patent [19]

Bachelet

[11] 4,148,492
[45] Apr. 10, 1979

[54] RECORD PLAYERS

[76] Inventor: Marc Bachelet, 11, rue Chapon, 75003 Paris, France

[21] Appl. No.: 814,538

[22] Filed: Jul. 11, 1977

[30] Foreign Application Priority Data

Jul. 20, 1976 [FR] France .............................. 76 22151

[51] Int. Cl.² ....................... G11B 17/06; G11B 3/10
[52] U.S. Cl. ............................. 274/15 R; 274/23 R
[58] Field of Search ................ 274/15 R, 23 R, 23 B

[56] References Cited

U.S. PATENT DOCUMENTS

| | | | |
|---|---|---|---|
| 2,952,464 | 9/1960 | Stimler | 274/15 R |
| 3,244,422 | 4/1966 | Hathaway | 274/23 B |
| 3,599,988 | 8/1971 | Norris | 274/15 R |
| 3,926,440 | 12/1975 | Wren | 274/23 R |

Primary Examiner—Steven L. Stephan
Attorney, Agent, or Firm—Bucknam and Archer

[57] ABSTRACT

The present invention relates to an improvement in record players comprising a turntable on which the disc is placed and a tone arm mounted to pivot at one of its ends and carrying a pick-up at its other end, said arm normally resting in stop position on a support member fast with the chassis of the record player, consisting in the provision, between the fixed support for the tone arm and its pivoting axis, of means for lifting said arm and moving it in a circular arc and for lowering the pick-up onto the lead-in groove of the disc, said means ensuring that the tone arm is lifted, when it reaches the end of the groove of the disc, describes a circular arc and is lowered on its fixed support member.

7 Claims, 15 Drawing Figures

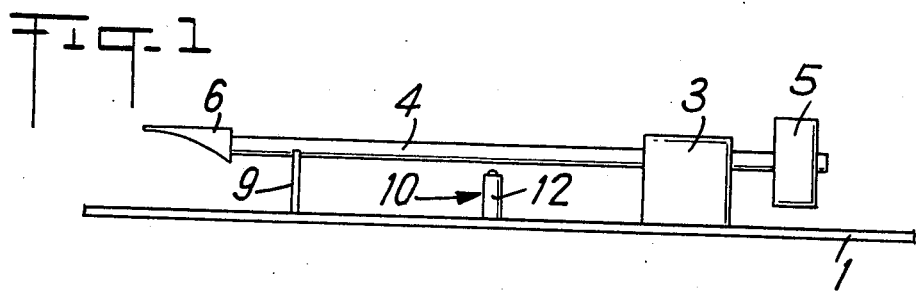
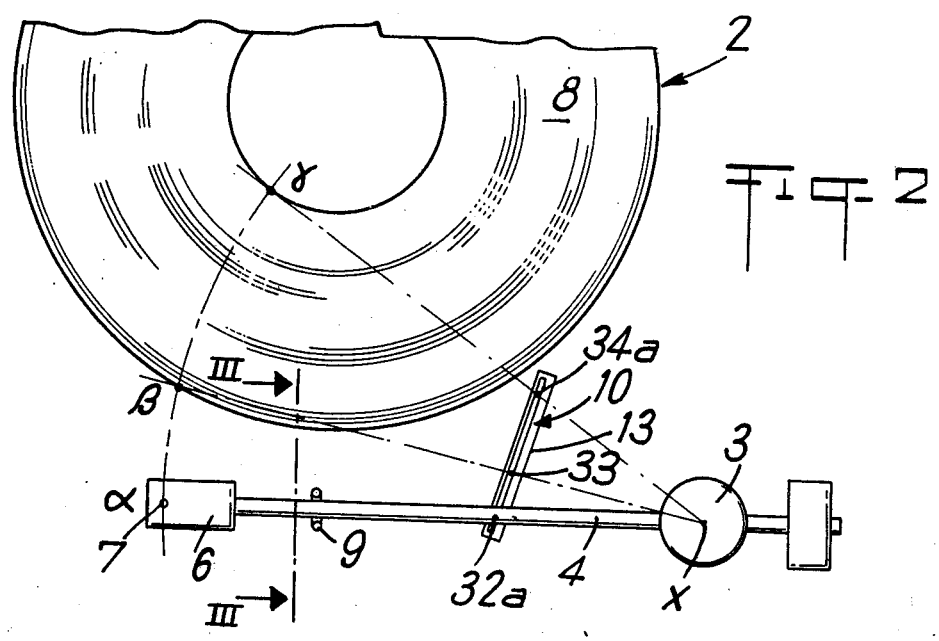
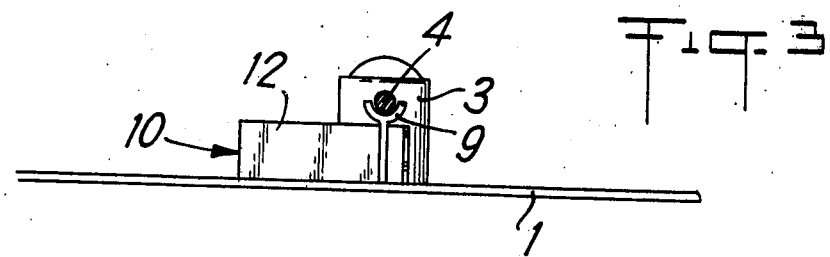

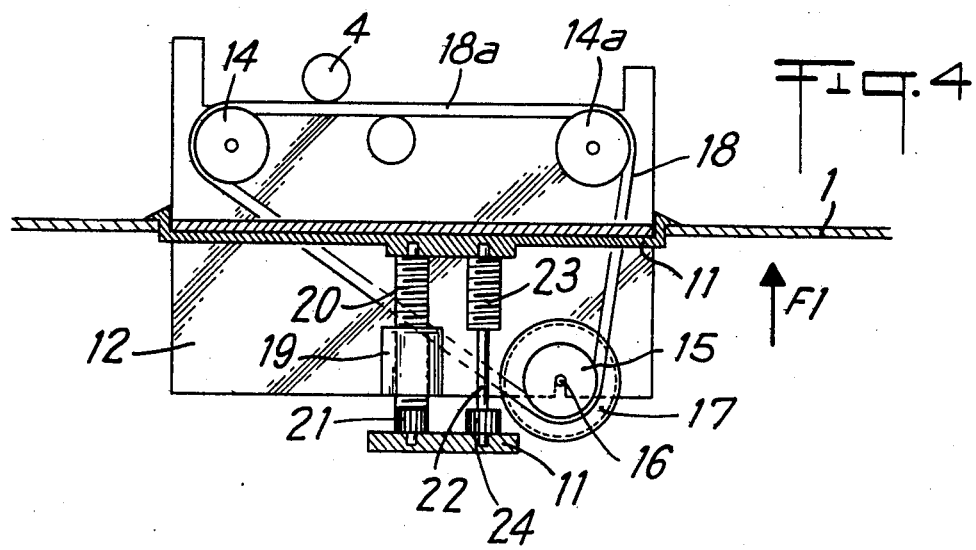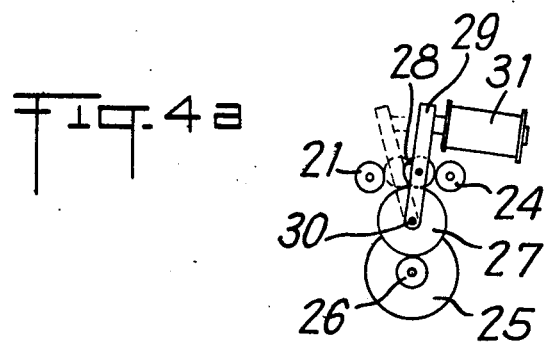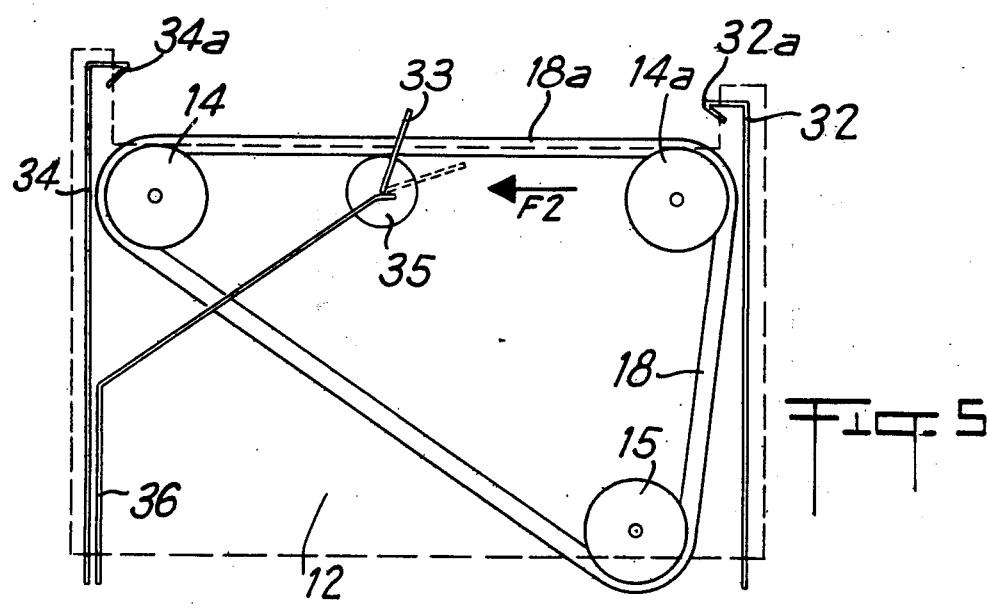

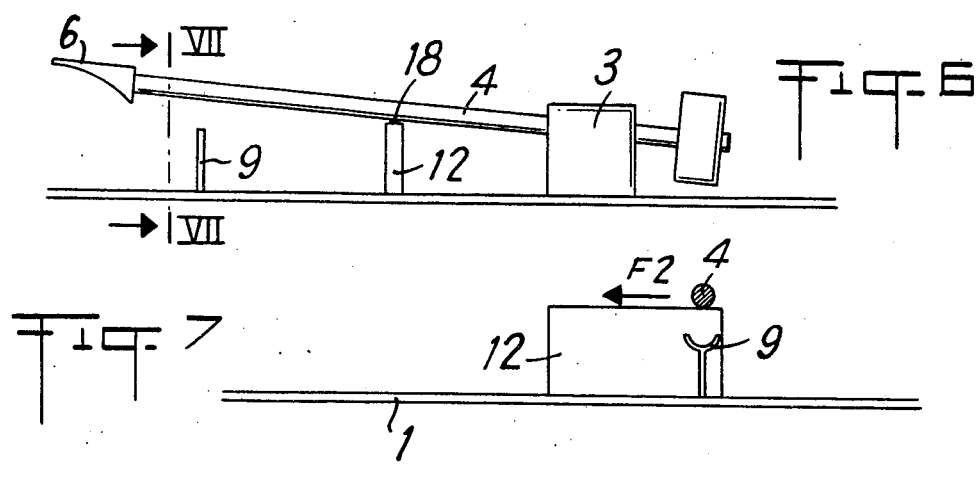
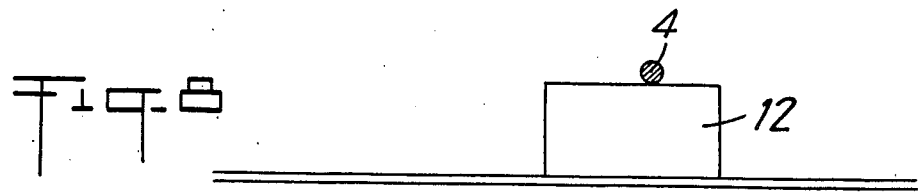
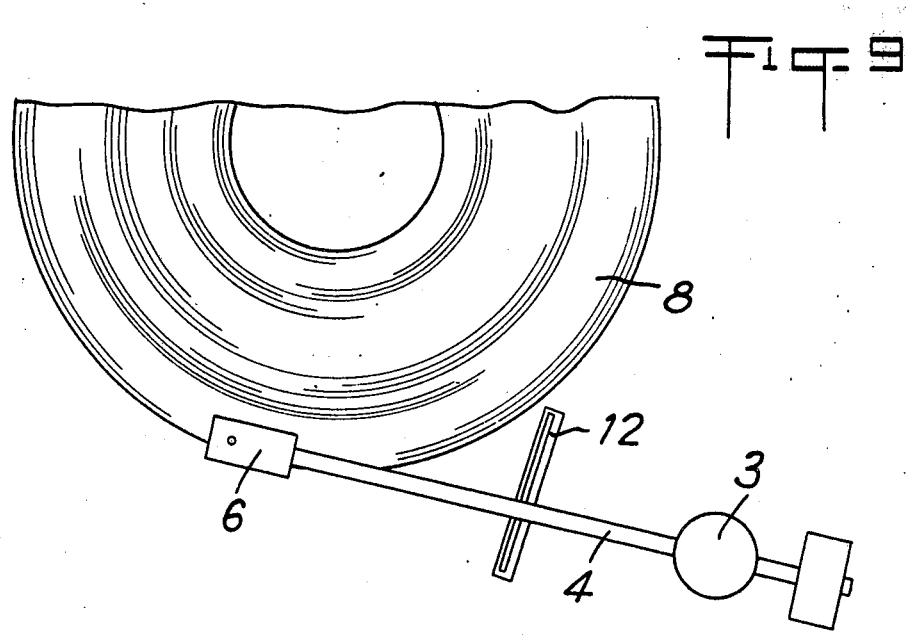

RECORD PLAYERS

The present invention relates to an improvement in record players.

For reproducing phonographic records under the best high-fidelity conditions, it is known to use record players in which the turntable on which the record is placed is driven by an electric motor, whilst the displacement of the tone arm carrying the pick-up is entirely manual, with no mechanisation.

Consequently, these record players have the advantage of maintaining the technological qualities of the turntable and of the tone arm, as these two elements remain independent of each other. The main drawback lies in the fact that the user is obliged to take action for each manipulation. In addition, these manipulations require a certain skill and care in order not to risk deteriorating the disc and the stylus.

This type of record player is intended for demanding users who consider that automation acts against the quality of reproduction.

Semi-automatic period players also exist which are a compromise between manual record players and automatic record players, for the above-mentioned reasons.

The essential difference between this type of record player and manual record players lies in the fact that, when the pick-up arrives at the end of the disc, the turntable stops automatically and the tone arm rises; the return of the tone arm onto its support member remains manual. The advantage of this device resides firstly in the automatic stopping of the tone arm and of the turntable, this dispensing the user of immediate action, and this automation compromises the qualities of the record player only slightly.

However, this device still comprises drawbacks in view of the fact that manual actions exist, accompanied by their constraints for the user, and the tone tone arm is fast with various mechanical members ensuring the automatic stopping, this taking away certain of its qualities.

In automatic record players without disc change device, the displacement of the tone arm towards the disc, its return to its support when the disc has been played, the lowering and rising of the tone arm are entirely automatic.

The only manual intervention is the starting of the cycle.

Certain apparatus are equipped with a repeater mechanism, enabling the listener to listen to the same record several times running, without having to actuate any device.

The mechanism which ensures this automatic working is relatively complicated and it comprises rods, springs, and valves.

The motive energy of this complex mechanism is furnished by the drive movement of the turntable, the rotation of which undergoes fluctuations generating flutter, irregularities in movement and noise.

The tone arm being fast with the mechanism and consequently with the turntable definitively loses its qualities, so much so that, at such a stage, the reproduction can no longer be considered as being of high fidelity.

Finally, record players also exist with a disc changing device whose characteristics are identical to those of the proceding model with, moreover, the advantage for the user of stacking several records above the turntable.

All the stacked dics are automatically played until they have all been heard. The drawbacks of the device are the same as previously, the possibility of stacking being accompanied by a more advanced mechanism and consequently contributing to accentuating the loss of quality of the pick-up.

The improvement according to the invention has for its object to allow discs to be played as perfectly as with a manually controlled record player, whilst avoiding the user manually displacing the tone arm at the beginning and at the end of the disc and returning it into rest position.

In accordance with the invention, there are disposed between the fixed support of the tone arm and its pivoting axis, means for lifting the arm and moving it in a circular arc and for lowering the pick-up onto the lead-in groove of the disc, said means ensuring that the tone arm is lifted when it reaches the end of the groove of the disc, describes circular arc and is lowered onto its fixed support member, said arm displacement means being controlled by stops adapted to come into contact with said arm during its displacement.

The stops act on electric contacts of a servocontrol circuit which communicates the necessary information to the members driving the arm displacement means.

This arrangement allows a complete and definitive independence of the tone arm from the turntable and the automatic working means.

The invention will be more readily understood on reading the following description with reference to the accompanying drawings, in which:

FIG. 1 is a view in elevation of an embodiment of a record player in rest position;

FIG. 2 is a plan view thereof in the same position as in FIG. 1.

FIg. 3 is an elevation view in the direction of arrows III—III of FIG. 2;

FIG. 4 is a view in elevation and in section showing the device for displacing the tone arm;

FIG. 4a is a plan view of the means of transmission of a drive member to the control members of FIG. 4;

FIG. 5 is a view in elevation of the tone arm displacing device and the stops controlling the electric contacts;

FIG. 6 is a side elevation view of the arm when it is raised;

FIG. 7 is an elevation view along the line VII—VII of FIG. 6;

FIG. 8 is the same view as FIG. 7 during the displacement of the arm in a circular arc.

FIG. 9 is a plan view of the record player when the pick-up is disposed at the lead-in groove of the disc;

Figure 10:
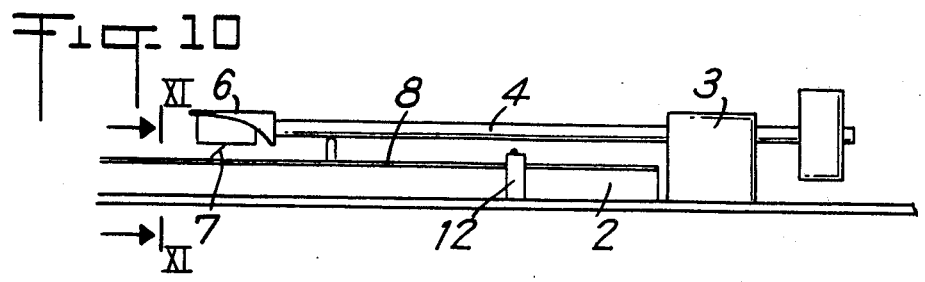
FIG. 10 is an elevation view of the record player with the tone arm at the lead-in groove of the disc.
Figure 11:
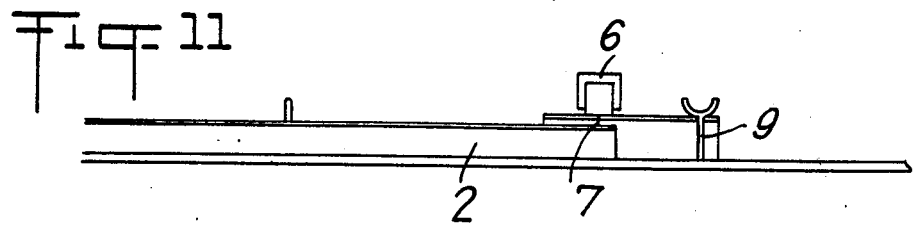
FIG. 11 is a view in elevation of the arm along arrow XI—XI of FIG. 10.

Referring now to the drawings, FIGS. 1, 2 and 3 show an embodiment of a record player which comprises a chassis 1 on which is rotatably mounted, in conventional manner, a turntable 2 on which a phonographic record is placed. On chassis 1 is fixed a pivot 3 of known type on which is mounted to pivot, about an axis X, a tone arm 4 carrying at one of its ends an adjustable counterweight 5 and at its other end a pick-up 6 containing, in known manner, a cartridge provided with a stylus 7 adapted to be engaged in the groove of the disc 8 (FIG. 10). When the device is in stop position, the tone arm 4 rests on a forked support member 9 fixed on the chassis 1.

Between the support member 9 and the pivot 3 are disposed, beneath the tone arm 4, the arm displacement means 10 shown schematically in FIGS. 1, 2 and 3.

These arm displacement means shown in greater detail in FIGS. 4, 4a and 5, comprise a frame 11 which is fixed to the chassis 1 and which is used as member for guiding a body 12 adapted to slide in a slot 13 (FIG. 2) of the chassis 1.

On the body 12 are mounted, in free rotation, rollers 14, 14a and a roller 15 fixed on a shaft 16 on which a tangential drive wheel 17 is fixed, said rollers 14, 14a and 15 carrying an endless belt 18 ensuring its guiding and drive. The endless belt 18 which acts as a conveyor belt is disposed so as to present a rectilinear part 18a in the upper part of the body on which the arm 4 rests to describe its circular arc about its axis X in two opposite directions.

In its lower part, the body 12 presents a nut 19 in which is engaged a worm 20 mounted to rotate in the frame 11 and it carries in its lower part a gear 21 which is connected by a transmission to a drive member, particularly an electric motor (not shown in the drawing). Parallel to the worm 20 is rotatably mounted on frame 11 a shaft 22 which carries at its upper end a worm 23 adapted to mesh with the tangential wheel 17 driving the wheel 18 via the roller 15 when the body 12 is lifted.

In its lower part, the shaft 22 is provided with a gear 24 which is connected by a transmission to a drive member (not shown in FIG. 4), particularly an electric motor.

FIG. 4a shows an embodiment of a means for driving the gears 21 and 24 by means of a single electric motor 25 whose shaft is provided with a drive gear 26 which meshes, via a gear 27, with a sliding gear 28 mounted on a shaft 30 mounted to pivot about a shaft 29 so as to bring the gear 28 into a position shown in solid lines (FIG. 4a) where it meshes with the gear 24 to drive the worm 23 and into a position in broken lines (FIG. 4a) where it meshes with gear 21 to drive worm 20.

The alternate displacement of the lever 29 is obtained by means of a control member, particularly an electromagnet 31.

On body 12 (FIG. 5) are mounted stops 32, 33 and 34 which are constituted by steel pins and are connected to electric contacts.

The stop 33 is mounted to pivot on a roller 35 driven by belt 18 when it moves in the direction of double arrow F, so that, for one of the directions of displacement, the stop 33 is in retracted position as shown in broken lines, said stop 33 being permanently connected to a control rod 36.

Figure 12:
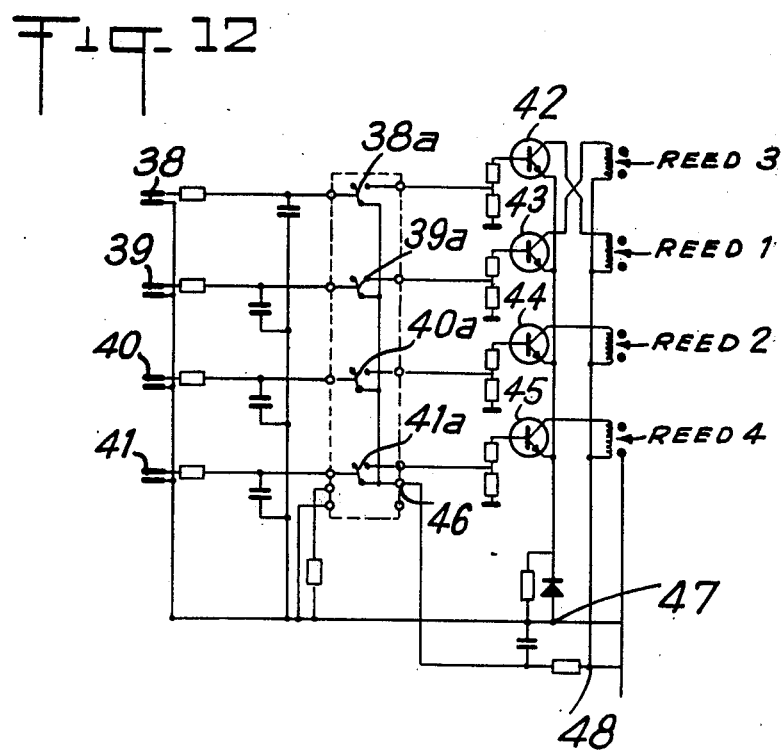
FIG. 12 is a diagram of the circuit controlling the relays by contacts.

FIG. 12 shows a circuit comprising contacts 38, 39, 40, 41 which are connected to an integrated circuit which is, in fact, a flip-flop, said circuit being symbolised, for the comprehension of the diagram, by switches 38a, 39a, 40a 41a controlled by contacts 38 to 41.

When one of the contacts 38 to 41 is actuated, it causes the switches 38a to 49a to be thrown so as selectively to connect the voltage of 12 volts, present at 46 to one of the bases of one of transistors 42 to 45 whose collector and emitter are respectively connected to the phases 47, 48 of a supply circuit.

Figure 13:
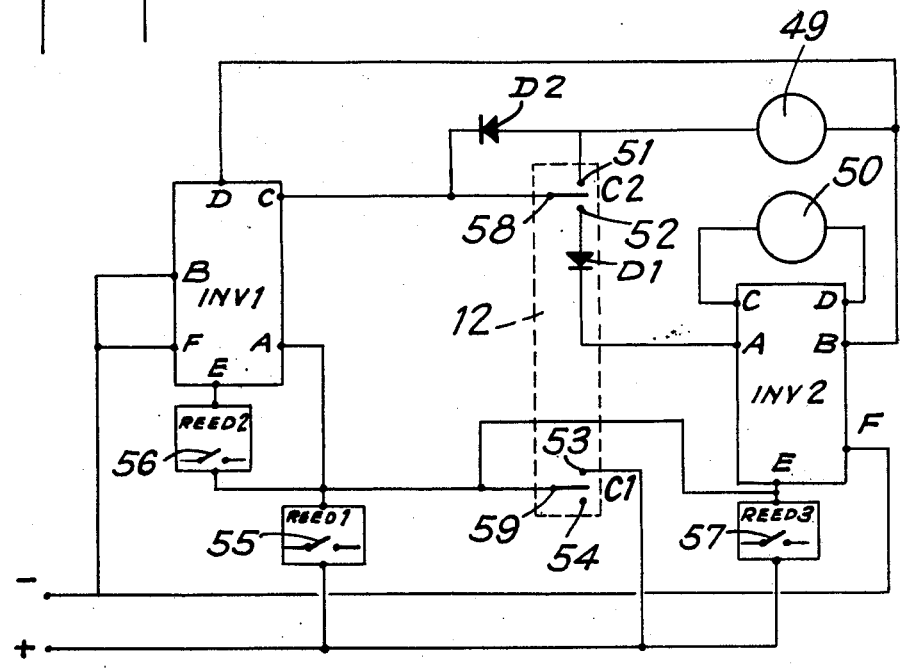
FIG. 13 is a diagram of an alternate embodiment of the circuit controlling the motors controlling the tone arm displacing means.

In the circuit of the collector of each transistor 42 to 45 there is interposed a coil of reed relay 3 - 1 and 2, which figure in the circuit of FIG. 13 showing the electric diagram for the control of the motors 49 ensuring the drive of the worm 20 and the rise or lowering of the body 12 and the motor 50 ensuring the drive of the worm 23 and the belt 18.

The control motors 49, 50 are supplied by a circuit comprising two reversing switches INV 1 and INV 2 controlled by the reed relays 2 and 3 of the switches C2 and C1 fast with the body 12 for displacement of the tone arm and a beginning and end of stroke reed relay 1 controlled by a contact.

Figure 13A:
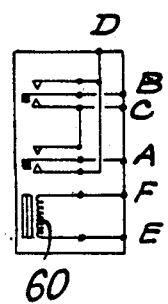
FIG. 13a is a detailed view of a reversing switch.

FIG. 13a shows in detail an embodiment of the reversing switches INV 1 and INV 2.

In the stop position, the tone arm 4 rests on its support member 9 as shown in FIGS. 1, 2 and 3, and the body 12 of the arm displacement means is in retracted position.

To switch the record player on, contact 39 is actuated which may be placed on the chassis 1 at any spot, so that the switch 39a establishes the connection between point 46 of the circuit and the base of the transistor 43 which becomes conducting and supplies the coil of starting reed relay 1. The contact 55 of the reed relay 1 is closed and shunts the switch C1 which is in position 54 when the body 12 is in low position. The positive voltage of the supply circuit is applied to the input A of the reversing switch INV 1 which is in rest position (FIG. 13a), the current leaves at C and the positive voltage is applied to point 59 of the switch C2 which is in position 51 which corresponds to the low position of body 12.

Consequently, the motor 49 is supplied from the outputs D and C of the reversing switch INV 1 and it drives, via gear 21, worm 20 and nut 19, the body 12 which rises in the direction of arrow F1.

At the beginning of the displacement of the body 12, the switch C1 passes from position 54 to position 53 and the switch C2 passes from position 51 to position 52 when the body 12 arrives in the desired position.

As the body 12 is rising, the tone arm 4 comes into contact with the belt 18 and said arm 4 is raised up to the desired height to disengage it from its support member 9 (FIGS. 6,7).

When the arm 4 has arrived at a certain height, the switch passes from position 51 to position 52 interrupting the supply of the motor 49 and the rise of body 12.

The positive voltage coming from C is directed towards one of the terminals of motor 50 through diode D1, the input A of reversing switch INV 2 in rest position, and the output C of said reversing switch, the negative voltage being applied to the other terminal via the output D of the reversing switch INV 2 which is connected by its input B to the negative output of the reversing switch INV 1.

The supply of the motor 50 causes the belt 18 to be driven by the gear 24, the worm 23 which meshes in high position with the tangential wheel 17 rotating with roller 15.

The belt 18 on which the tone arm 4 rests drives said latter in the direction of arrow F2 until said arm comes into contact with the stop 33 (FIGS. 2, 5-8, 9) corresponding to point β at the lead-in groove in disc 8. The stop 33 acts, by the rod 36, on the contact 40 and causes the throwing of switch 40a which supplies the base of the transistor 44 and consequently renders this latter conducting for the supply of the coil of reed relay 2 whose contact 56 comes into position of closure.

The inputs EF of the reversing switch INV 1 are then connected to terminals of the source of supply and the coil 60 of the reversing switch INV 1 is supplied, thus causing said reversing switch to pass into working position.

The voltage at the terminals of the outputs C and D of the reversing switch INV 1 is reversed so that C is negative and D positive.

The output voltage of C of the reversing switch INV 1 is applied to the point 52 of the switch C2.

The direction of the diode D1 preventing the passage of the negative voltage, said latter passes through diode D2 to supply the motor 49. The polarities of the supply current of the motor 50 being reversed, said latter rotates in the opposite direction and causes, via the worm 20 and nut 19, the descent of the body 12 and consequently the descent of the tone arm 4. When the body 12 arrives in low position, the switch C1 passes from position 53 to position 54, thus cutting the supply of motor 50 and of reversing switches INV 1 and INV 2.

In the course of the descent of arm 4, the stylus 7 of the pickup 6 comes into contact with the groove of the disc 8 whilst the body 12 and belt 18 are in retracted position, releasing the arm 4 which may be driven normally by the rotation of turntable 2.

At the end of the groove of disc 8 in position γ, the tone arm 4 comes into contact with stop 34a (FIG. 5) which, via rod 35, actuates the contact 38 causing the throwing of the switch 38a connecting point 46 to the base of the transistor 42 which supplies, as before, the coil of the reed relay 3 whose contact 57 comes into position of closure.

This arrangement makes it possible to shunt the switch C1 into position of opening and to apply a positive voltage to the input A and to the output C of the reversing switch INV 1 so as to supply the motor 49 as in the first starting operation, the output D presenting a negative voltage, and the switch C2 being in position 51.

This results in the body 12 being driven in the direction of arrow F1 and the tone arm 4 rising, the stylus 7 of which leaves the groove of the disc whilst the arm rests on belt 18.

When the body 12 arrives in high position, the switch C2 passes from position 51 to position 52 applying a positive voltage to the input A of the reversing switch INV 2 through diode D1.

The reversing switch INV 2 is then in working position, and the outputs C and D are reversed in polarity, the positive voltage being applied to the input and to the output D and the negative voltage being applied to the input B and to output C. This results in a reversal of the polarities at the terminals of the motor 50 which causes the displacement of the belt in the direction opposite that of arrow 2 and the return of the tone arm 4 towards point α.

The functioning of the belt in opposite direction drives roller 35 and causes the retraction of stop 33 which occupies the position shown in broken lines so that, on its return, the tone arm 4 has no effect on stop 34.

When the arm 4 reaches point α, i.e. above its support member 9, it comes into contact with stop 32a which, via rod 32, acts on the starting contact 39 and closes the switch 39a which connects the base of the transistor 43 to point 46. The wiring of reed relay 1 being doubled with that of reed relay 3 (FIG. 12), this contact 39 supplies, through reed relay 2, the reversing switch INV 1 which passes into working position. The negative voltage through C2 in position 52 is stopped by diode D1; this negative voltage being able to pass through D2, it supplies motor 49 whose polarity is reversed. This has for its effect to drive the body 12 in opposite direction to arrow F1 and to allow the tone arm 4 to rest on the support member 9 as in FIGS. 1, 2, 3.

When the body 12 arrives in low position, the switch C1 passes from position 53 to position 54 cutting the general supply of motors 49, 50 and of reversing switches.

Each time a contact 38 to 41 is actuated, the contact previously used is annulled.

For example, the end of disc contact 38 is in circuit when the stop contact is actuated, the reed relay 3 passes into rest position and the reed relay 2 into working position.

It is possible to repeat the playing of the disc ad infinitum with a supplementary push button intended to orientate the action of the stop electrode towards reed relay 1. When the tone arm 4 returns, at the end of the disc, to its rest member 9, the contact 39 acts on the reed relay 1 and is directed towards a reed relay 4 closed in rest position which cuts the supply of the reversing switch, this having for its effect to re-establish the rest position of the reversing switch INV 2.

The tone arm arriving on the stop 32a and touching it, the belt begins to move in the opposite direction, thus driving the arm towards the disc.

What is claimed is:

1. A record player comprising a chassis having a slot, a turntable rotatably mounted on the chassis on which a record disc is placed, a pivot fixed on the chassis, a tone arm mounted on said pivot at one of its ends and carrying a pick-up at its other end, said arm normally resting in a stop position on a support member fast with the chassis, arm displacement means for lifting said arm, causing the arm to move in a generally horizontal circular arc and for lowering the pick-up onto the lead-in of the groove of the disc, located between the fixed support member for the tone arm and its pivot, said means lifting the tone arm when it reaches the end of the groove of the disc, causing the tone arm to move in a generally horizontal circular arc and lowering the pick-up onto its fixed support member, said means being independent of the drive movement of the turntable, stationary stops, said arm contacting said stops during its displacement, wherein the arm displacement means comprise a frame fixed on the chassis and a body which is guided by said frame and which is mounted to slide vertically in said slot provided in the chassis, said body being driven selectively in two opposite vertical directions, said body having an endless belt guided and driven by rollers rotatably mounted on said body, said endless belt being disposed so as to present a rectilinear part in the upper part of the body, said tone arm resting on said rectilinear part for its movement in said circular arc, and drive means for said body and said rollers, said drive means being selectively operated to drive the body in its vertical motion and to drive the rollers to thereby drive the endless belt and to drive the tone arm in its circular arc.

2. The record player of claim 1, wherein the body drive means is constituted by a worm mounted to rotate on the chassis and engaged in a nut fast with the body, said worm being selectively driven in two opposite directions by means of a transmission member which is connected to a drive member.

3. The record player of claim 1, wherein the body moves to a high position and one of the rollers carrying the endless belt is fixed on the same shaft as a tangential wheel adapted to mesh when the body is lifted with a worm rotatably mounted on the chassis and driven in rotation in two opposite directions by a transmission by means of a drive member.

4. The record player of claim 2, wherein said transmission member comprises two gears which are adated to be connected to the drive member by a sliding gear mounted on a pivoting rod selectively controlled by an electromagnet.

5. The record player of claim 2 which is provided with two motors for controlling the vertical displacement of the body from its upper position to the lower position and controlling the belt for horizontal drive, which motors are part of an electric circuit comprising a first set of two reversing switches, and a second set of two switches fast with the body, said second set of switches having two relays for control of the reversing switches, and a beginning and end of stroke reed relay controlled by a contact actuated by the tone arm.

6. The record player of claim 5, wherein each contact controls a switch adapted to supply the base of a transistor whose collector and emitter are respectively connected to the phases of the supply circuit of a relay coil which is interposed in the circuit of the collector of each transistor.

7. The record player of claim 6, wherein the contacts are connected to stop members mounted on the body of the arm displacement device, one of the stops being retractably mounted on a roller driven by the endless belt.

* * * * *